A. POZZO AND G. COLONNETTI.
APPARATUS FOR TESTING IRONS.
APPLICATION FILED AUG. 17, 1917.

1,335,985.

Patented Apr. 6, 1920.
5 SHEETS—SHEET 1.

Alberto Pozzo & Gustavo Colonnetti
Inventors
by Lawrence Langner
Attorney

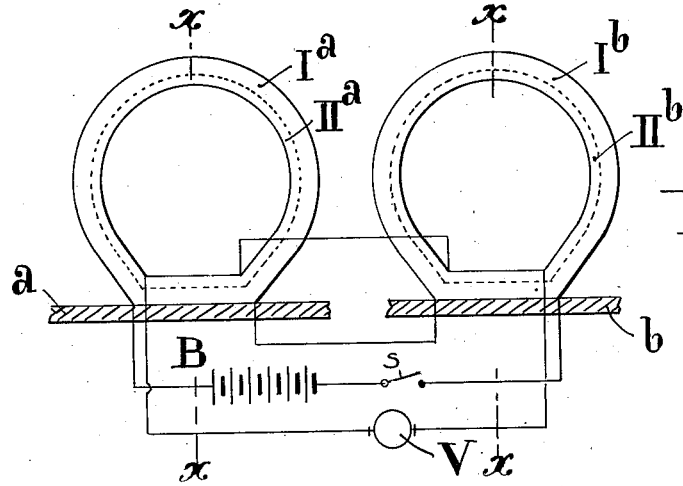
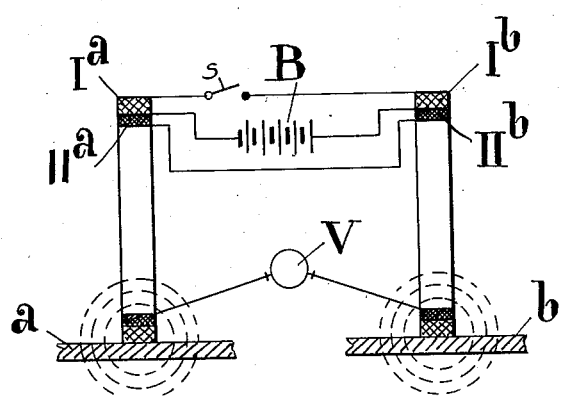
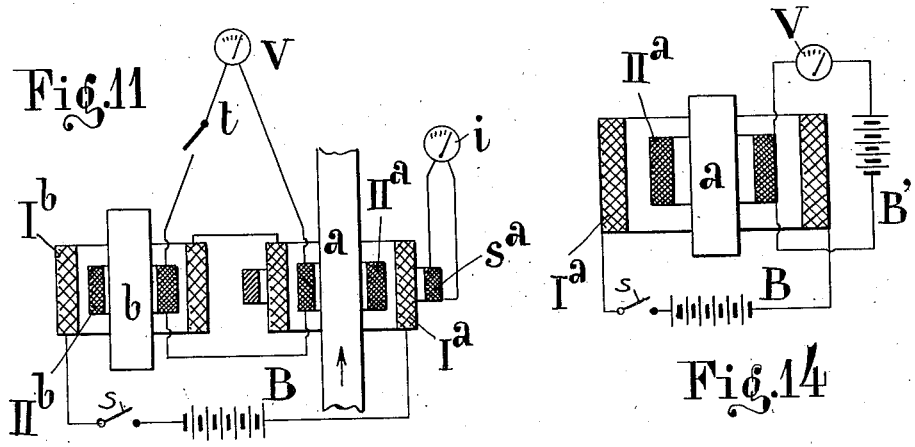
Alberto Pozzo & Gustavo Colonnetti
Inventors

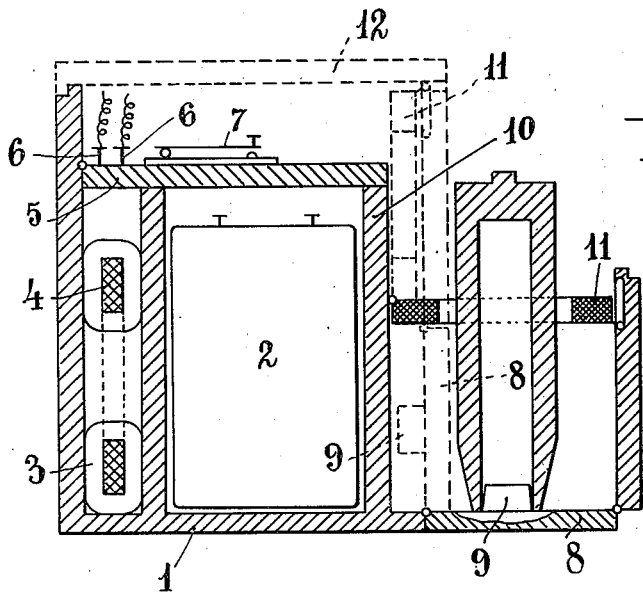
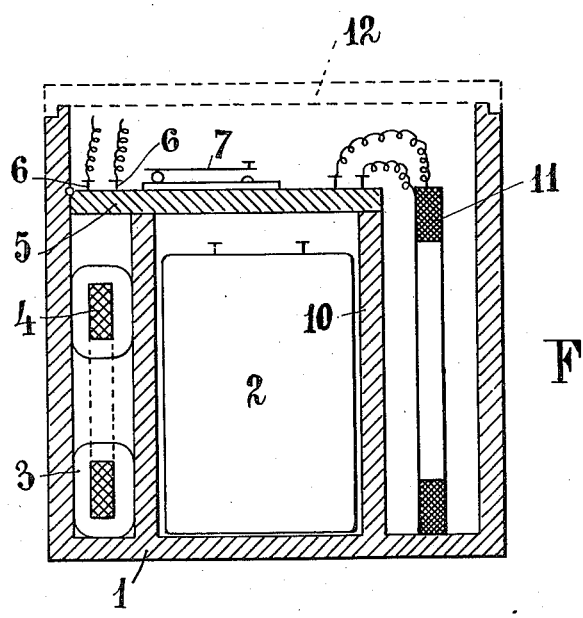

A. POZZO AND G. COLONNETTI.
APPARATUS FOR TESTING IRONS.
APPLICATION FILED AUG. 17, 1917.

1,335,985.

Patented Apr. 6, 1920.
5 SHEETS—SHEET 5.

Alberto Pozzo & Gustavo Colonnetti
Inventors
by Laurence Langner
Attorney

UNITED STATES PATENT OFFICE.

ALBERTO POZZO AND GUSTAVO COLONNETTI, OF TURIN, ITALY.

APPARATUS FOR TESTING IRONS.

1,335,985.  Specification of Letters Patent.  Patented Apr. 6, 1920.

Application filed August 17, 1917. Serial No. 186,736.

*To all whom it may concern:*

Be it known that we, ALBERTO POZZO and GUSTAVO COLONNETTI, subjects of the King of Italy, and residents of Turin, Italy, have invented certain new and useful Improvements in Apparatus for Testing Irons, of which the following is a specification.

This invention relates to an improved apparatus for testing irons by means of which tests are carried out on machined or partly machined pieces as distinguished from especially prepared samples, without injuring them. These tests are effected by measuring the magnetic permeability of the material, based on the clearly defined relations which exist between the magnetic permeability of iron materials and their mechanical characteristics.

The apparatus according to this invention, gives a reading with means for indicating the magnetic permeability of the material being tested, said reading being obtained by comparing with electric current having a known value the electric current induced in a winding by variations in the value of magnetic flux passing through the piece to be tested and interlinked with said winding, said piece being located in a magnetic field which generates said flux.

For this purpose the piece to be tested and a suitable standard piece may be placed in magnetic fields having equal intensities, said pieces energizing secondary windings which are inserted in opposition with each other in the circuit of a suitable indicator or like apparatus.

Said variations of flux, which must have equal values in both fields, may be obtained by a plurality of methods; for instance when primary windings are energized by means of direct current, said variations may be obtained by suddenly cutting or reversing the current or by moving to a like extent and in the same manner both secondary windings so as to vary the number of lines of force interlinked with them. In the case said primary windings are energized by an alternating current, the flux generated by this current is quickly varied and reversed in a repeated succession and therefore repeated current impulses are produced in the secondary windings which cause the indicator of the measuring apparatus to take up a position of equilibrium showing the value of difference between currents induced in said secondary windings.

Finally in the case the magnetic fields are produced by means of permanent magnets, these magnets or the secondary windings may be quickly moved with regard to the piece being tested and to the standard piece, to thereby produce sudden variations in the magnetic circuits interlinked with said secondary windings and consequently developing two induced current impulses whose difference is shown by said measuring apparatus.

In any case the current, generated by variations of flux depending upon the magnetic permeability of the piece to be tested is compared with and opposed to a current of proper and known value, and therefore the total deflection of the indicating member is reduced and the exactness of the reading may be magnified, the test thus permitting of exceeding slight differences in the characteristics of the material to be detected; further, the characteristics of the test piece may be compared directly with like characteristics of the standard piece, which are well known, without necessitating calculation or study to determine the relation between magnetic and mechanical characteristics of the material under test.

In the accompanying drawings which show, by way of example, some construction of the apparatus according to this invention;

Figs. 3, 4, 5 and 6 show further arrangements of apparatus adapted for testing large pieces as bars, bands, plates or the like;

Fig. 7, shows another arrangement of the same;

Fig. 8, is a section on $x$—$x$, Fig. 7;

Fig. 11, shows, diagrammatically, a construction of an apparatus for testing pieces of considerable length and of practically constant sectional area;

Fig. 12, is a section of a portable apparatus embodying all parts required for its operation the same being shown in operative position;

Fig. 13, is a transverse section of a similar apparatus in closed condition;

Fig. 14, shows the diagram of an apparatus in which a current of known value is used in opposition to the current induced in the secondary winding of the test piece;

Fig. 17, is a diagram of an apparatus for testing elongated or continuous pieces as wires or the like.

Figure 1:
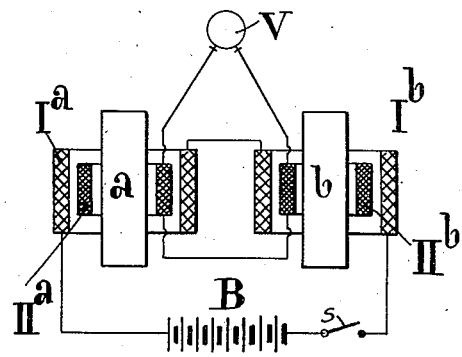
Figure 1 is a diagrammatic view of an apparatus according to this invention.

In the construction shown in Fig. 1, the piece of material —a— to be tested and a standard piece —b— are located in magnetic fields generated by two primary coils or windings $1^a$ and $1^b$ respectively, which are connected, in series with a source of current B, said pieces acting as cores for two secondary windings or coils $11^a$ and $11^b$, respectively, which are identical with each other and are connected in opposition to each other in the circuit of a suitable indicator V (for instance a ballistic galvanometer in the case of energizing by a direct current). Variations in magnetic fields, and in fluxes generated thereby, may be obtained as about described by manipulating a switch —s—, inserted in the circuit of the battery B and primary coils $1^a$ and $1^b$, to close and open the circuit of the energizing current, or by moving said pieces —a— and —b— with regard to their respective fields.

With the device shown in Fig. 2 it is possible to neutralize the influence due to variations of shape or size at given points of pieces subsequently tested.

As it is known, the value of the voltage induced in turns of secondary winding $11^b$ depends, among other things, upon the number of lines of magnetic force passing through said winding.

In the case of having to test in succession a number of partly machined pieces which differ in shape or thickness at given portions thereof, the secondary winding $11^b$ is placed in register with the portion of said pieces which is more regular in its shape and thickness but, notwithstanding this care, said winding is energized to a given extent by the lines of force due to said irregular portions, and owing to this fact the voltage induced in said winding and therefore the reading of indicating apparatus may possibly have different values in connection with different test pieces although these pieces are made of the same material and have the same general shape.

This may take place when testing a number of partly machined projectile shells, of the kind shown in Fig. 12 which have a body of constant shape and thickness but ordinarily show differences in thicknesses at their bottom or at their mouth, the test being made before the same are true finished or machined.

In this case the secondary coil, which in Fig. 12 is shown by reference 11, being arranged to encircle said body is also influenced by lines of force due to material at said bottom or mouth and therefore on subsequently testing shells having identical shape and size and made of the same material but showing differences in thickness of said bottom or mouth different voltages and therefore different readings may be obtained.

Figure 2:
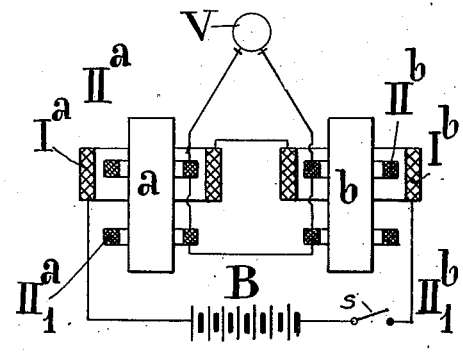
Fig. 2 shows a modified arrangement of the same.

By means of the arrangement shown in diagram by Fig. 2 this difficulty is obviated by an additional coil located in register, or substantially in register, with said irregular portion of the piece to be tested, so that this coil is influenced directly by said irregular portion of the piece. Thus the greater the size of this irregular portion and therefore the influence of main secondary coil, the greater will be the influence of the same on the additional coil which may be called correcting coil. By connecting the main coil and correcting coil in series with and in opposition to each other the voltage induced in the correcting coil compensates for the extra voltage induced in main coil by said irregular portion; the voltage induced by the regular portion encircled by said main coil being thus unaltered, readings obtained in connection with subsequently tested pieces are independent from the size and dimension of said irregular portion.

The correcting coil must have a smaller number of turns than the main coil in proper proportions as the same must only neutralize the extra voltage induced in the main coil by said irregular portion of the piece tested. This is obtained by means of said smaller number of turns in the correcting coil with regard to the larger number of turns of main coil, since the latter is located at a distance from said irregular portion and therefore it is not energized to as great an extent as the correcting coil which is located in proximity to said irregular portion of the piece.

For the purpose above explained, the arrangement according to Fig. 2 comprises two primary windings $I^a$ and $I^b$ fed by a battery B and controlled by a switch s as in Fig. 1 and each of the secondary windings consists of two coils that is $II^a$ and $II^a_1$ and $II^b$ and $II^b_1$; coils $II^a_1$ and $II^b_1$ being the correcting coils for the standard and the test piece respectively.

Correcting coil $II^b_1$ has less turns than main coil $II^b$ and is wound in opposite direction than or connected in opposition with main coil $II^b$; and, likewise, correcting coil $II^a_1$ has less turns than the main coil $II^a$ and is connected in opposition to main winding II$^a$. The correcting coils II$^a_1$ and II$^b_1$ are intended to be located in register with portions of the standard and test piece which are liable to have different size in the subsequently tested pieces.

The test piece secondary winding comprising coils II$^b$ and II$^b_1$ is further connected with indicating apparatus V in opposition to standard secondary winding consisting of coils II$^a$ and II$^a_1$; thus the indicating apparatus V is energized by a voltage equal to the difference between voltages induced in test piece secondary winding II$^b$ and in standard secondary winding II$^a$, each of these voltages being in turn the difference between voltage induced in main coil and voltage induced in the correcting coil.

Variations in the energizing flux may be obtained either by any of the means above described or by modifying the distance between the opposite groups or turns of secondaries.

Figure 3:
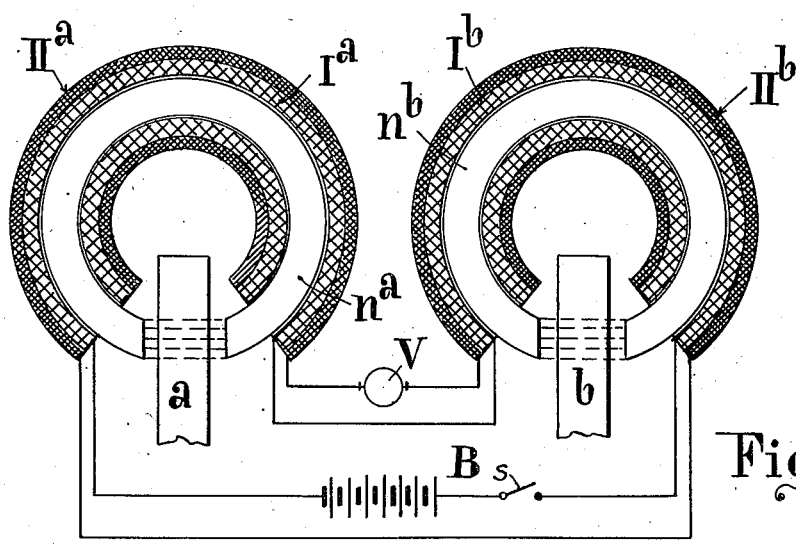

Fig. 3, shows, diagrammatically, a construction of the apparatus which is more particularly adapted for testing pieces of unusual or irregular dimensions. In said construction the secondary winding II$^a$, is influenced by the variations occurring in the magnetic field or circuit which is generated by the primary winding I$^a$ mounted on the open or horse-shoe core —n$^a$— on inserting into the same the piece —a— to be tested. Windings I$^a$ and II$^a$ are connected in the manner above described with the standard winding I$^b$ and II$^b$ as well as with the battery B and indicator V.

Figure 4:
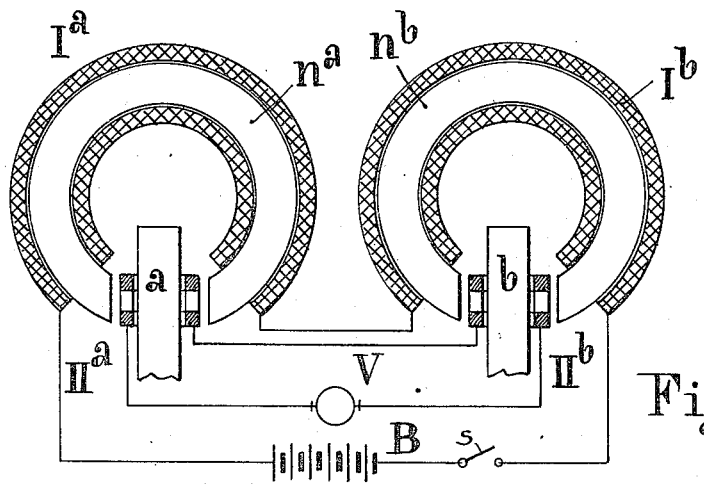

The construction shown in Fig. 4 is similar to that just described, the secondary windings II$^a$ and II$^b$ being located around the piece to be tested and around the standard respectively.

Figure 5:
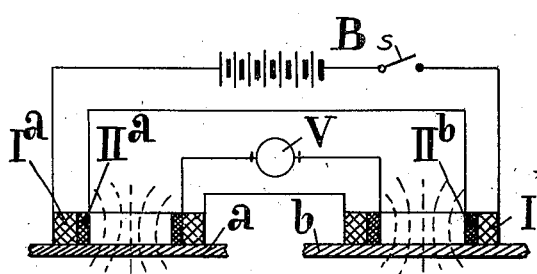
Figure 6:
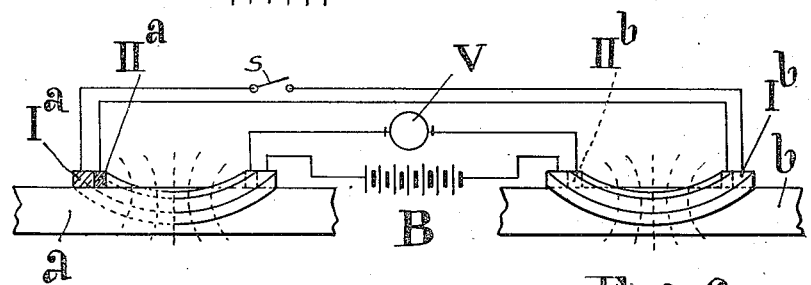

Figs. 5 and 6, show, diagrammatically, simpler constructions having coils, each of which comprises a primary and a secondary winding, these windings being arranged to form a single coil. In this case one of the coils comprising primary windings I$^a$ and secondary winding II$^a$ is placed upon the piece to be tested and the other one comprising primary winding I$^b$ and secondary winding II$^b$ is placed upon the standard; said windings are properly connected in the manner above stated to each other and to the battery B and indicator V.

In the cases of Figs. 7 and 8, the coils, instead of encircling portions of the test piece —a— and of standard —b— or of lying flat thereon, are located or supported thereon in edgewise position. The secondary windings II$^a$ and II$^b$ are thus energized by the lines of force passing through the materials; the same are connected in opposition to each other in the circuit of the indicator V and the primary winding I$^a$ and I$^b$ are connected in series with the battery B and switch s.

In the arrangements shown in Figs. 5, 6, 7 and 8, variations in flux can be obtained merely by moving the coils with regard to the piece to be tested and to the standard.

Figure 9:
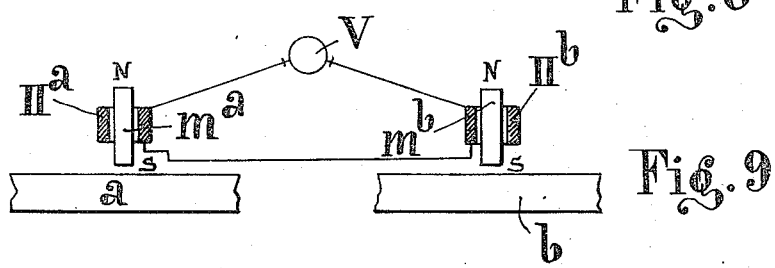
Figs. 9 and 10, show two constructions of an apparatus in which the magnetic field is generated by permanent magnets.
Figure 10:
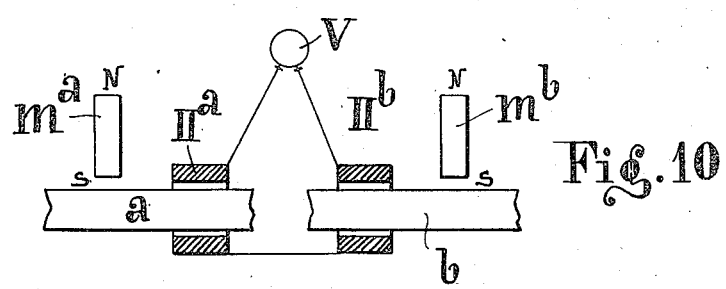

In the apparatus shown in Figs. 9 and 10 the magnetic fields are generated by means of permanent magnets —m$^a$— and —m$^b$— while the secondary windings II$^a$ and II$^b$ are arranged to encircle either the magnets themselves as shown by Fig. 9 or the piece —a— and the standard —b— as in Fig. 10. In both cases variations in flux can be obtained by moving the magnets simultaneously and to an equal extent with regard to test piece and standard or by moving the secondary windings on said parts.

Instead of inspecting reading of the indicating device, the secondary winding of the piece to be tested may be connected successively to and in opposition with secondary windings of a number of standard pieces having different characteristics and located in magnetic fields all of which have an intensity equal to that of the magnetic field in which is located the test piece; obviously, when, during this operation, it is found that no deflection is shown by the indicating device as the secondary winding of test pieces is connected with the secondary winding of a given standard, it is shown that said test piece and standard have the same characteristics.

Figure 15:
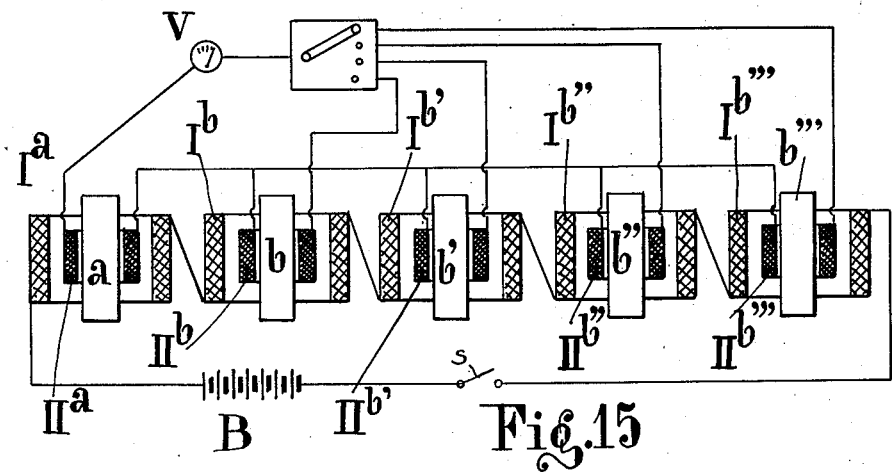
Fig. 15, is the diagram of an apparatus by means of which the piece may be compared with several standards.

This construction is shown in Fig. 15, in which the primary windings, I$^a$, I$^b$, I$^{b'}$, I$^{b''}$, I$^{b'''}$ encircling, respectively, the test piece and the several standards, are connected in series with the battery B and switch s while the secondary winding II$^a$ of the test piece —a— may be inserted in the circuit of the indicator V in opposition to the secondary winding of either of the standards by means of the switch C.

In any case, it is not necessary to use a standard piece, the secondary of which is in opposition to the secondary of the piece to be tested, since instead of the current induced by the secondary of the standard, a suitably gaged direct current may be used, the same being adapted to act on the indicating device in opposition to the current induced in secondary winding of the test piece. Such an apparatus is shown in Fig. 14 in which a battery B' is inserted in opposition to the secondary winding II$^a$ in the circuit of the indicating device V, so that the impulse produced in the secondary winding II$^a$ by the flux in the piece —a— gives rise in the indicator V, which is permanently deviated by the current of the battery B', to a deviation in opposite direction, said contrary deviation being such as to bring back the needle to zero only when the current or impulse produced by the secondary II$^a$ is equal to the intensity of the gaged current generated by the battery B'. When the needle is not brought back to zero it indicated that a difference exists between the current generated in the secondary II$^a$ and the gaged current of the battery B' and thus indicates that the test piece and standard piece have different characteristics.

When the piece to be tested has considerable length and a practically uniform sectional area, the test may be effected by means of any one of the apparatus above described by moving said piece with regard to the coils and by repeating the operation time by time or by holding the indicating device in continuous operation.

It is further possible to provide an apparatus particularly adapted for the above stated purpose by providing the measuring apparatus with an indicator controlled by the electromotive force generated by the variations in flux which are produced in the magnetic field in which lies the piece to be tested by variations in magnetic characters of the same piece.

In this case when it is desired to test a long piece of practically uniform sectional area, the above described operation is firstly carried out on a portion of the piece (for instance by comparing the piece with a standard) and then, after having disconnected the measuring apparatus, the piece is shifted by any suitable means with regard to its coils, the test being repeated whenever the indicator shows a variation in the flux due to primary current, this variation corresponding to a change in the magnetic and mechanical characters of the piece.

This arrangement is shown in Fig. 11. In the circuit of the main indicator or measuring apparatus V is inserted a switch —$t$—; and the piece —$a$— to be tested is encircled by a secondary winding S$^a$ in which is inserted an indicator —$i$— operated by the electromotive force which is induced by variations in flux generated by the primary current, said variations being due to change in characters in the different parts of the piece which subsequently come to interlink with the winding S$^a$ during the relative motion between the piece and apparatus.

In this case a test is first made by means of the main indicator V (the switch —$t$— being closed) by comparing a portion of the piece —$a$— with the standard —$b$— and then the indicator V is disconnected by opening the switch —$t$— and the piece —$a$— is displaced axially. Any deviation in the indicator —$i$— will indicate that a change has occurred in the characters of the piece —$a$— and a new test may be made by comparing said portion of the piece —$a$— with the standard in the described manner.

Figure 16:
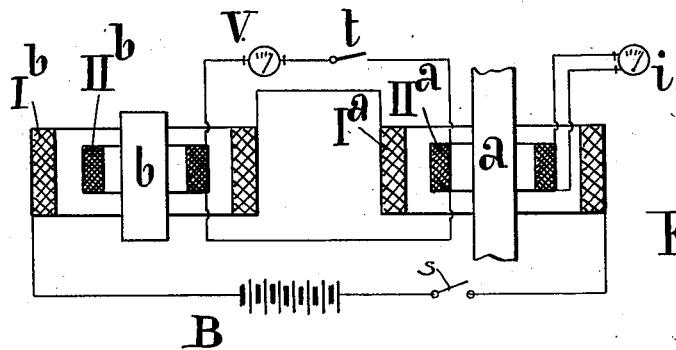
Fig. 16, is the diagram of an apparatus provided with two indicators.

Instead of using an additional secondary winding S$^a$ for operating the indicator —$i$—, the latter can be connected with the secondary II$^a$ independently of the main indicator V; this construction is shown in Fig. 16.

The magnetic inductor field to be used in coöperation with indicator —$i$— may be generated either by the same means generating the magnetic field for the operation of the main indicator or by other means which can be of the kind above referred to or of any other known type.

Finally, the indicator —$i$— may be used alone, that is without the main indicator or measuring apparatus V; in this case the arrangement may comprise a single primary winding I$^a$ and a single secondary winding S$^t$ which is connected with the indicator —$i$—. This construction of the apparatus may be used when it is desired to test wires forming cables or the like for the purpose of discovering breaks or interruptions therein.

Of course the displacement of the piece with regard to the inductor system can be obtained by moving either said system or the piece; and as indicator —$i$— any known apparatus may be used which is capable of detecting weak electromotive forces, such as precision galvanometers, voltmeters and ammeters, telephone receivers, relays or the like.

The described apparatus may be used to ascertain variations of physical and mechanical properties of iron materials subjected to strains or stresses at the same time as external forces are acting thereon, and more particularly during mechanical acceptance tests. It is thus possible to ascertain gradually all physical and mechanical changes produced in the material by the mechanical tests and to measure the total value of said changes. This method may be applied for measuring rehardening and deformations in test pieces under action of tension, pressure, bending and torsion stresses, or in hollow bodies such as projectiles, tubes, receptacles or the like under the action of very high hydraulic pressures, or finally in parts such as girders, axles or the like when submitted for acceptance to tests by direct loading.

The test may be effected by means of any of the described apparatus either by comparing the piece to be tested with a suitable standard piece or by measuring directly the electric current induced in the secondary winding of the test piece by the variations in the magnetic flux. To this end, the apparatus shown in Fig. 11 may be used, both indicators being energized if required by the same secondary winding II$^a$ and in this case the indicator —$i$— may be intended to detect the beginning of the deformation or of re-hardening while main indicator V allows of measuring the value of said change by effecting a test of comparison with a proper standard piece.

If desired the indicator —i— may be used for measuring variations produced in the material and for adding successively the different phases of the phenomenon, so as to indicate at each time the measure of rehardening or of the total variation. In this case an integrating instrument will be used as indicator, that is to say a fluxometer or like apparatus.

Figure 17:
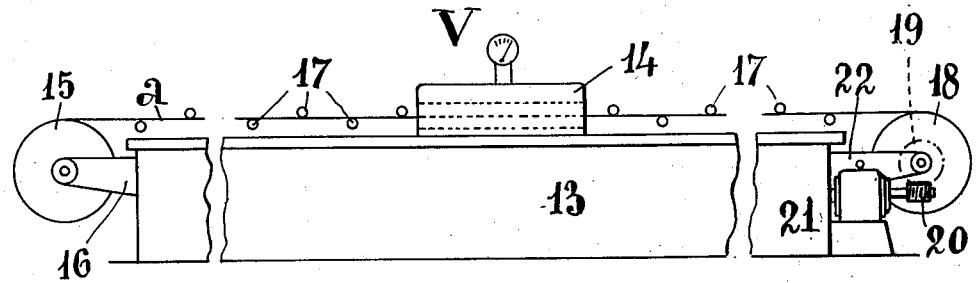

Fig. 17, shows a construction of apparatus for testing pieces having considerable length as wires or the like. In said construction the case 14 contains the apparatus and is provided with the indicator V, said case being mounted on a support or bench 13 and the wire —a— being wound on a bobbin 15 carried by brackets 16. Said wire is supported by a number of rollers 17 and passes through the testing apparatus, the same being wound at the other end on another bobbin 18 carried by brackets 22 and operated by a motor 21 and a proper gear 19—20. The wire —a— is thus caused to pass with reduced speed through the apparatus, the indicator V detecting the differences between its characters in the subsequent portions thereof.

Suitable means may be provided on the support or bench 13 for subjecting the wire to tensile stresses and detect the changes caused in it by the same, as above described.

The parts of the apparatus may be advantageously mounted so as to form an easily portable and manipulated apparatus, as shown by way of example in Figs. 12 and 13.

The apparatus shown in Fig. 12, which is intended to test pieces having more or less constant shape and dimensions, comprises a box 1 of suitable shape and material, in which are arranged a source of electric current (for instance a battery 2) and the standard coil 3 (comprising primary and secondary windings) wound on an iron core 4. A removable partition 5 carries the reversing key or switch 7 and the terminals 6 for connection with an indicating device. One of the walls as 8 is hinged to the bottom of the box and comprises several sections pivoted together, so that it may take up the position shown in full lines in the drawing and thus forms a support for the piece to be tested (for instance a projectile shell) which is caused to take the required position by a piece intended to engage it, say by a projection 9 secured to the wall 8. Of course the piece to be tested can be placed in any desired position in the apparatus.

To walls 9 and 10 is pivoted a coil 11 intended to encircle the piece to be tested and comprising a primary winding and a secondary winding. Owing to this arrangement, the coil 11 takes the horizontal position shown in full lines when the wall 8 is let down, while, when this latter is raised up, the coil takes up the position shown in dotted lines.

When the box is closed by raising the wall 8, this latter is locked by the cover 12 engaging the upper edge of the same. The apparatus may be provided with the correcting coil or winding as described in connection with Fig. 2, which may be properly arranged according to circumstances. For instance this coil may be arranged on the wall 8 on which the piece to be tested is supported.

The construction, shown in Fig. 13, comprises a box 1, in which are located the battery 2, and the standard winding 3, while the partition 5, carries a key or switch 7, and the terminals for connection with the indicator. In this case all the walls of the box are made rigid, and coil 11 is normally located in a space of the box from which it may be withdrawn in order to be located on the piece to be tested. The coil is connected by means of flexible wires 13 to terminals 14 mounted on a wall of the box, and this latter is provided with a cover 12. This type of apparatus may also have a correcting coil which may be arranged in the same space as the coil 11 or in a proper space provided for this purpose.

What we claim as our invention and desire to secure by United States Letters Patent is:—

1. An apparatus for testing irons by comparing the magnetic properties of the test piece with those of a standard piece, comprising, two equal windings, each having an air gap in which the test piece and the standard, respectively, may be freely located; means for generating by said windings two magnetic fields of the same intensity; two secondary windings adapted to be energized, respectively, by the test piece and the standard; and an indicating apparatus to which said two secondary windings are connected in opposition.

2. An apparatus for testing irons by comparing the magnetic properties of the test piece with those of a standard piece, comprising, two equal windings inserted in the circuit of one and the same source of interrupted direct electric current, each of said windings having an air gap in which the test piece and the standard, respectively, may be freely located; two secondary windings adapted to be energized respectively by the test piece and the standard; and an indicating apparatus to which said two secondary windings are connected in opposition.

3. An apparatus for testing irons by comparing the magnetic properties of the test piece with those of a standard piece, comprising, two equal windings each having an air gap in which the test piece and the standard, respectively, may be freely located; means for generating by said windings two magnetic fields of the same intensity; two secondary windings adapted to be energized by the test piece and the standard, respectively, each of said secondary windings comprising a main coil and auxiliary coil in series with and wound in opposite direction to said main coil, said auxiliary coils being adapted to be positioned where it will register with portions of the test pieces which may have different shapes and sizes in various test pieces, to compensate for such difference and cause the reading to be correct; and an indicating apparatus to which said secondary windings are connected in opposition.

4. An apparatus for testing irons comprising a box having a hinged wall, a source of electric direct current in said box, means for interrupting the current, two coils each comprising a primary and a secondary winding, said primaries being connected in series with the source of current and the secondaries being wound in opposition to each other, an indicating apparatus on the secondary circuit, one of said coils being pivoted to the hinged wall and to a stationary part of the box, said pivoted coil coming into position to receive the test piece when the box is opened.

In testimony whereof we have signed our names to this specification in the presence of two subscribing witnesses.

ALBERTO POZZO.
GUSTAVO COLONNETTI.

Witnesses:
  MARIO DE GIORGIS,
  CAPRIOGLIO FRANCESCO.